(12) United States Patent
Byram

(10) Patent No.: US 6,486,764 B2
(45) Date of Patent: Nov. 26, 2002

(54) ROTARY POSITION SENSOR

(75) Inventor: Robert James Byram, Grand Blanc, MI (US)

(73) Assignee: Delphi Technologies, Inc., Troy, MI (US)

( * ) Notice: Subject to any disclaimer, the term of this patent is extended or adjusted under 35 U.S.C. 154(b) by 48 days.

(21) Appl. No.: 09/785,542

(22) Filed: Feb. 16, 2001

(65) Prior Publication Data

US 2002/0113681 A1 Aug. 22, 2002

(51) Int. Cl.[7] .............................................. H01F 21/00
(52) U.S. Cl. .................... 336/110; 335/205; 324/207.25
(58) Field of Search .................. 336/110; 335/205–207, 335/220–229; 324/207.11–207.2, 207.25

(56) References Cited

U.S. PATENT DOCUMENTS 3,976,339 A * 8/1976 Sabnis ......................... 308/10
5,337,030 A * 8/1994 Mohler ...................... 310/156
5,818,223 A * 10/1998 Wolf ...................... 324/207.12

* cited by examiner

*Primary Examiner*—Lincoln Donovan
*Assistant Examiner*—Tuyen T. Nguyen
(74) *Attorney, Agent, or Firm*—Vincent A. Cichosz

(57) ABSTRACT

A rotary position sensor featuring a robust and simply constructed magnetic field assembly which provides a uniform magnetic field in the working air gap for a conventional mangetosensitive device located thereinside. The magnetic field assembly includes a plastic casing having a blind hollow, magnet pocket located at the blind end of the hollow, and a pair of diametrically opposed pole piece pockets oriented in upstanding relation to the magnet pocket. A permanent magnet is snapped into the magnet pocket, and a pole piece is respectively snapped into each of the pole piece pockets. The pole pieces may be rectangular or arc shaped, wherein the space therebetween forms the working air gap into which the magentosensitive device is placed. The magnetic field established in the working air gap is transverse to the axis of the blind hollow, and is generally uniform.

19 Claims, 5 Drawing Sheets

ROTARY POSITION SENSOR

TECHNICAL FIELD

The present invention relates to rotary position sensors used to sense rotary movement using a sensor including a magnetosensitive device, such as a Hall effect device, and more particularly to a magnetic assembly therefor.

BACKGROUND OF THE INVENTION

Rotary position sensors utilize a magnetic field and a magnetosensitive device, such as a Hall effect device or a magnetoresistor located within the magnetic field. To detect rotational movement as between a first article (such as for example a rotatable throttle shaft of an air control valve) and a second article (such as for example a stationary base), the magnetic field is oriented transverse in relation to the axis of rotation of the first article, and the magnetosensitive device is located inside the magnetic field. The member providing the magnetic field is connected to one of the articles, and the magnetosensitive device is connected to the other article. As the articles rotate relative to each other, the magnetosensitive device is caused to change its angular position relative to the magnetic field direction, resulting in a change of output signal from the magnetosensitive device responsive to its angle with respect to the magnetic field direction. This change in signal is indicative of the angular position as between the first and second articles.

FIGS. 1 and 2 depict a typical configuration of a prior art rotary position sensor 10. A shaft 12 supports a magnetic assembly 14 including two mutually opposed permanent magnet arcs 16, 18 and a keeper ring 20. A working air gap 22 is provided between the magnet arcs 16, 18, wherein a magnetic field B is provided therebetween having a direction D locally defined by the magnetic lines L. The magnet arcs 16, 18 are glued or bonded into place on the keeper ring 20. A magnetosensitive device 24 (as for example an AISC chip, such as a Melexis MLX90215 or Alegro ATS635LSB) is placed into the working air gap 22, and is connected to a base 26 by at least one peg 28. FIG. 3 depicts the magnetic field strength as a function of distance along the cross-section line 30. and indicates the magnetic field is nonuniform in that it drops in field strength on either side of the center of the working air gap.

What remains needed in the art is a magnet assembly for a rotary position sensor which is robust, yet simply constructed, and which provides a uniform magnetic field in the working air gap.

SUMMARY OF THE INVENTION

The present invention is a rotary position sensor featuring a robust and simply constructed magnetic field assembly which provides a uniform magnetic field in the working air gap for a conventional mangetosensitive device located thereinside.

The magnetic field assembly according to the present invention includes a plastic casing having a blind hollow, magnet pocket located at the blind end of the hollow, and a pair of diametrically opposed pole piece pockets oriented in upstanding relation to the magnet pocket. A permanent magnet is snapped into the magnet pocket, and a pole piece is respectively snapped into each of the pole piece pockets. The pole pieces may be rectangular or arc shaped, wherein the space therebetween forms the working air gap into which the magentosensitive device is placed. The magnetic field established in the working air gap is transverse to the axis of the blind hollow, and is generally uniform.

The aforesaid snapping feature is provided preferably by a plurality of nibs located at the periphery of the magnet and pole piece pockets which interferingly engage the respective magnet and pole pieces so as to retain them fixedly seated with respect thereto.

The casing may be configured to interface with either a stationary or rotatable article, as for example via a shaft cavity for being press-fit onto an end of a shaft.

Accordingly, it is an object of the present invention to provide a rotary position sensor including a simply constructed, snap together magnet assembly.

This and additional objects, features and advantages of the present invention will become clearer from the following specification of a preferred embodiment.

DESCRIPTION OF THE PREFERRED EMBODIMENT

Figure 1:
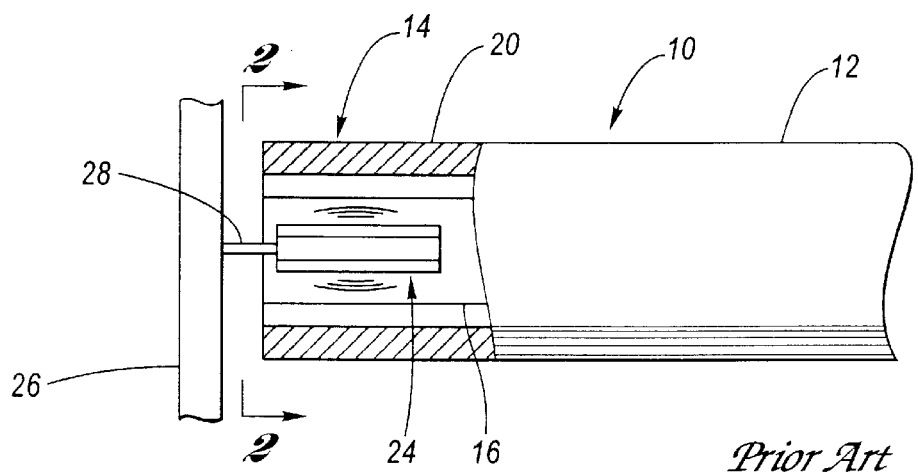
FIG. 1 is a partly sectional side view of a prior art rotary position sensor which is press-fit onto a shaft end.
Figure 2:
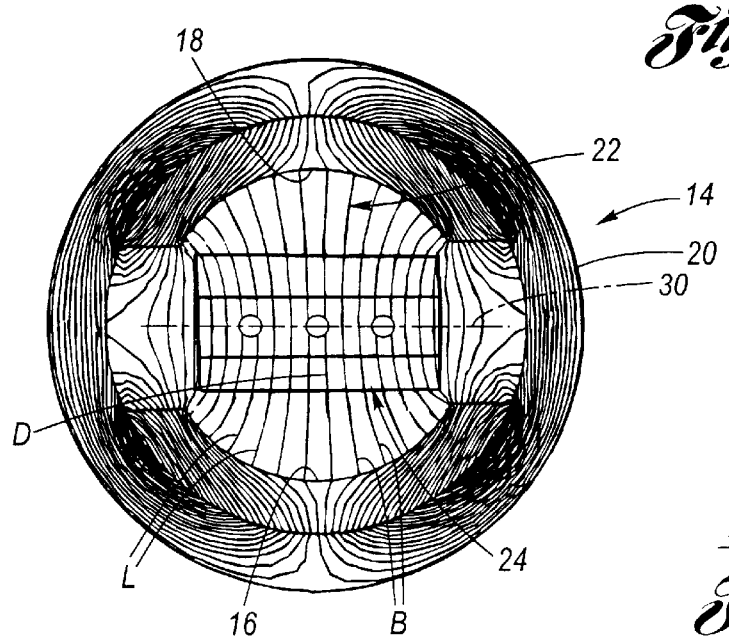
FIG. 2 is an end view seen along line 2—2 of FIG. 1.
Figure 3:
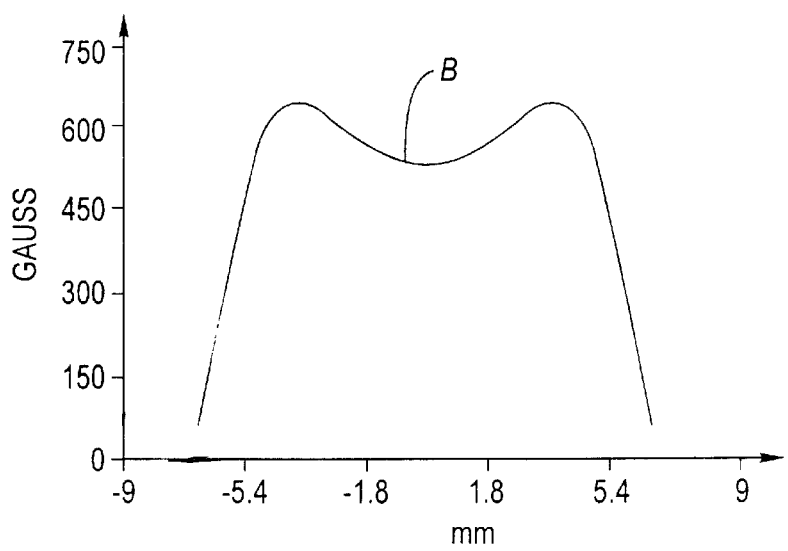
FIG. 3 is a graph of magnetic field strength versus cross-sectional position of the prior art rotary position sensor of FIGS. 1 and 2.
Figure 4:
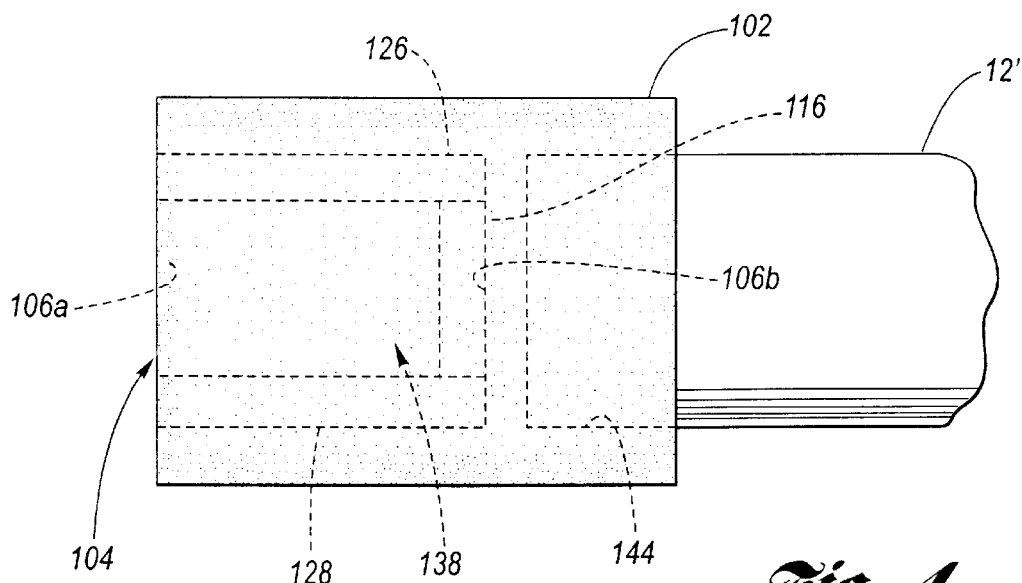
FIG. 4 is a partly sectional side view of a magnet assembly according to the present invention, shown press-fit onto a shaft.
Figure 5:
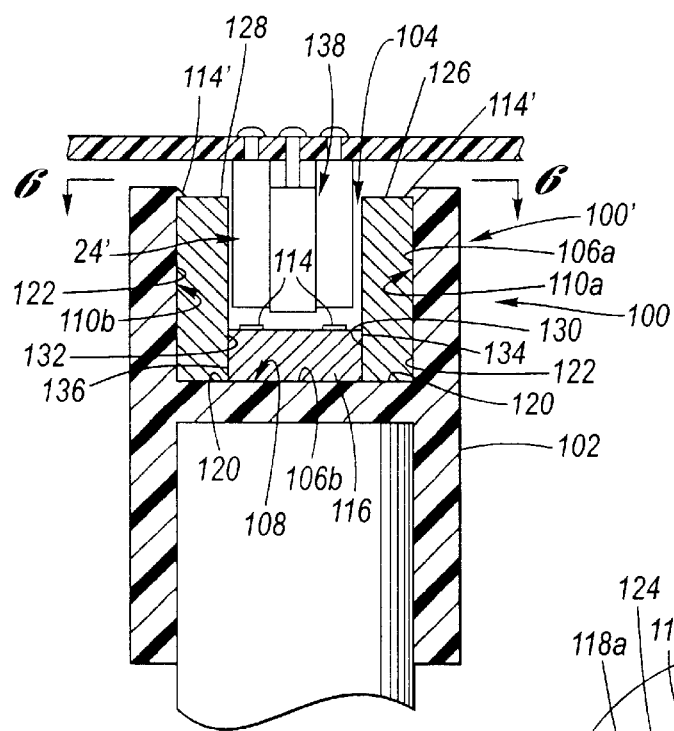
FIG. 5 is a partly sectional side view of a rotary position sensor having a magnet assembly according to the present invention.
Figure 6:
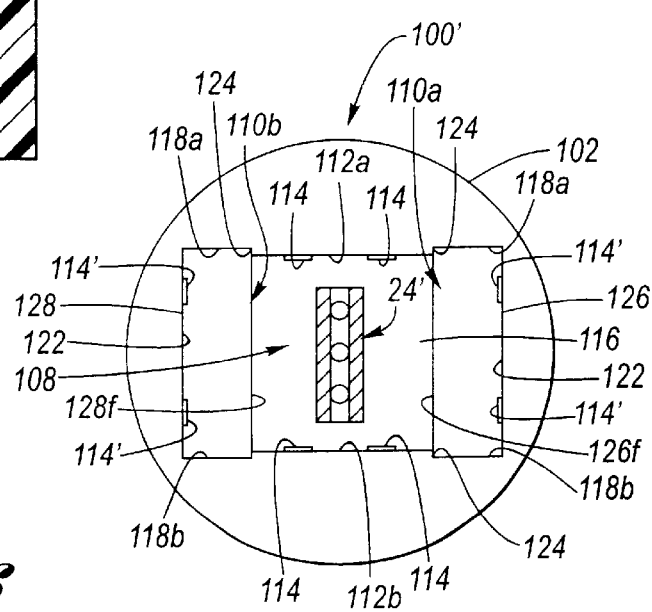
FIG. 6 is a partly sectional view seen along line 6—6 of FIG. 5.

Referring now to the Drawing, FIGS. 1 through 11 depict examples of a rotary position sensor according to the present invention.

Turning attention firstly to FIGS. 4 through 8, aspects of a first rotary position sensor 100 utilizing a first magnet assembly 100' according to the present invention are depicted. The first magnet assembly 100' includes a plastic casing 102 having a blind hollow 104 formed therein defined by a sidewall 106a and a blind end 106b. A magnet pocket 108 and a pair of diametrically opposed pole piece pockets 110a, 110b are formed in the casing 102 at the sidewall and blind end 106b of the blind hollow 104.

The magnet pocket 108 is formed in the blind end 106b, having a preferably rectangular recess cooperatively defined by mutually opposed magnet pocket walls 112a, 112b and the aforesaid blind end. At each of the magnet pocket walls 112a, 112b is formed at least one nib 114 which protrusively overhangs the magnet pocket 108.

A permanent magnet 116 having a shape complementary to that of the magnet pocket 108 is snapped into the magnet pocket by being pressed past the nibs 114, which resiliently give and then overhang the permanent magnet upon its being seated at the magnet pocket.

The pole piece pockets 110a, 110b are formed in the sidewall 106a of the casing 102 in upstanding relation to the magnet pocket 108 and in perpendicular relation to the magnet pocket walls 112a, 112b. Each pole piece pocket 110a, 110b is defined by a preferably rectangular recess cooperatively defined by mutually opposed pole piece pocket walls 118b, 118b, a bottom wall 120 preferably in plane with the blind end, and a back wall 122 which is perpendicular to each of the pole piece pocket walls and the bottom wall. The pole piece pocket walls 118a, 118b are offset in relation to their respectively adjacent the magnet pocket walls 112a, 112b, thereby forming a pair of abutment shoulders 124. At each of the back walls 122 is formed at least one nib 114' which protrusively overhangs the respective pole piece pocket 110a, 110b.

A pair of pole pieces 126, 128, are provided for placement into the pole piece pockets 110a, 110b, each being composed of a ferromagnetic material, and each being complementarily shaped with respect to its pole piece pocket. Each pole piece 126, 128 is snapped into its respective pole piece pocket 110a, 110b by being, pressed past the nibs 114', which resiliently give and then overhang the respective pole piece upon its being seated at the respective pole piece pocket. When seated, each pole piece 126, 128 has a face 130, 132 which is in good contact with a respective permanent magnet pole 134, 136 thereby providing minimal reluctance to the magnetic circuit (shown at FIG. 7) at the interface therebetween.

The permanent magnet 116 is fixed in place relative to the casing 102 by the nibs 114 versus the blind end 106b, the opposed magnet pocket walls 112a, 112b and the two pole pieces 126, 128. Each pole piece 126, 128 is fixed in place relative to the casing 102 by the nibs 114' versus the bottom wall 120, the opposed pole piece walls 118b, 118b, and the back wall 122 versus the permanent magnet 116 and the abutment shoulders 124.

Figure 7:
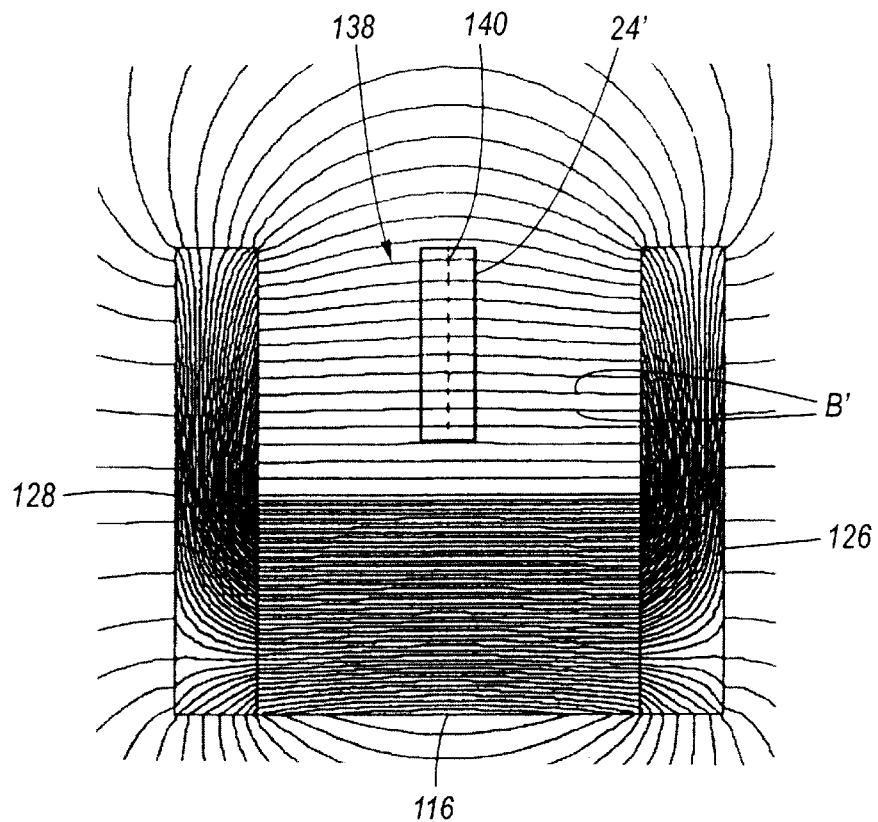
FIG. 7 is a view of the working air gap environs of the magnet assembly as shown at FIG. 5, depicting the magnetic field.
Figure 8:
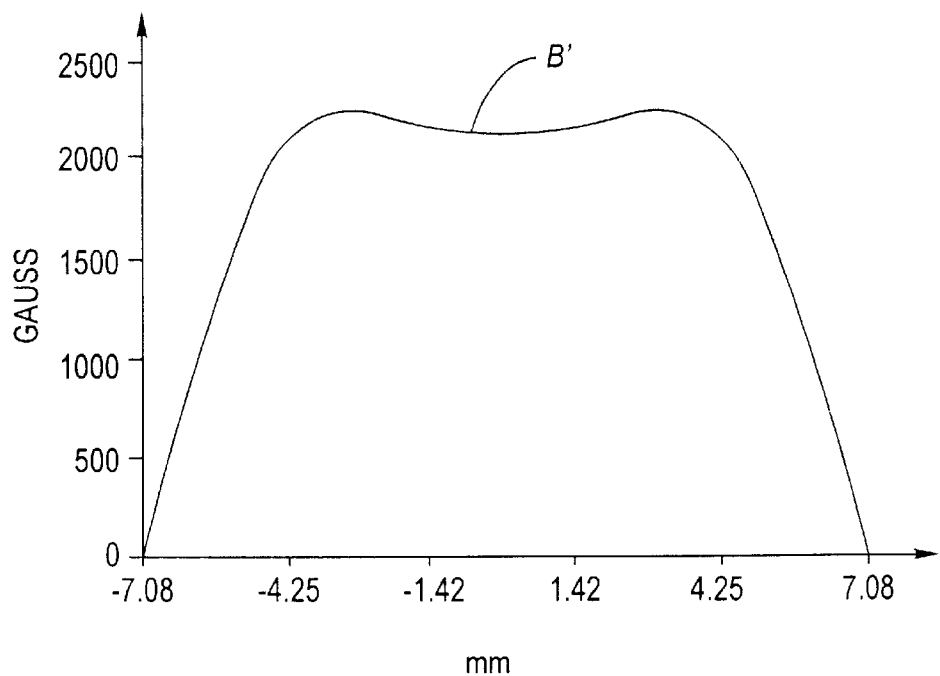
FIG. 8 is a graph of the magnetic field strength versus position for the working air gap of FIG. 7.

As shown at FIGS. 7 and 8, the magnetic field B' which is provided in the working air gap 138 between the pole piece faces 126f, 128f is substantially uniform along the axial centerline 140. Accordingly, the signal output of a magnetosensitive device 24' placed into the working air gap is accurately responsive to its orientation with respect to the direction of the magnetic field B in the working air gap.

The casing 102 is configured to be associated with an article which is rotatable with respect to the base 142 (which may, for example, be a circuit board) upon which the magnetosensitive device 24' is connected. For example, the article may be a shaft 12' having an end which is press-fit into a shaft cavity 144 formed in the casing 102 opposite the bind hollow 104.

Figure 9:
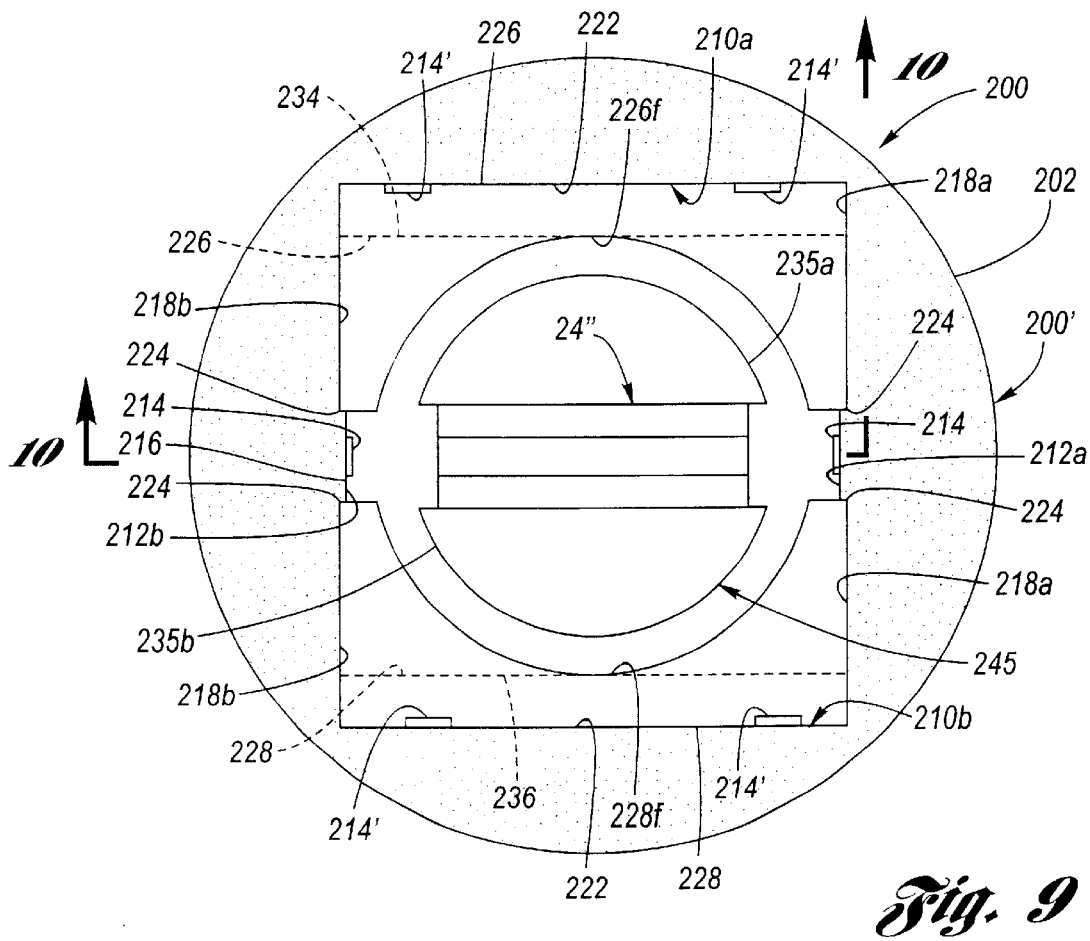
FIG. 9 is a plan view of an alternate rotary position sensor according to the present invention.
Figure 10:
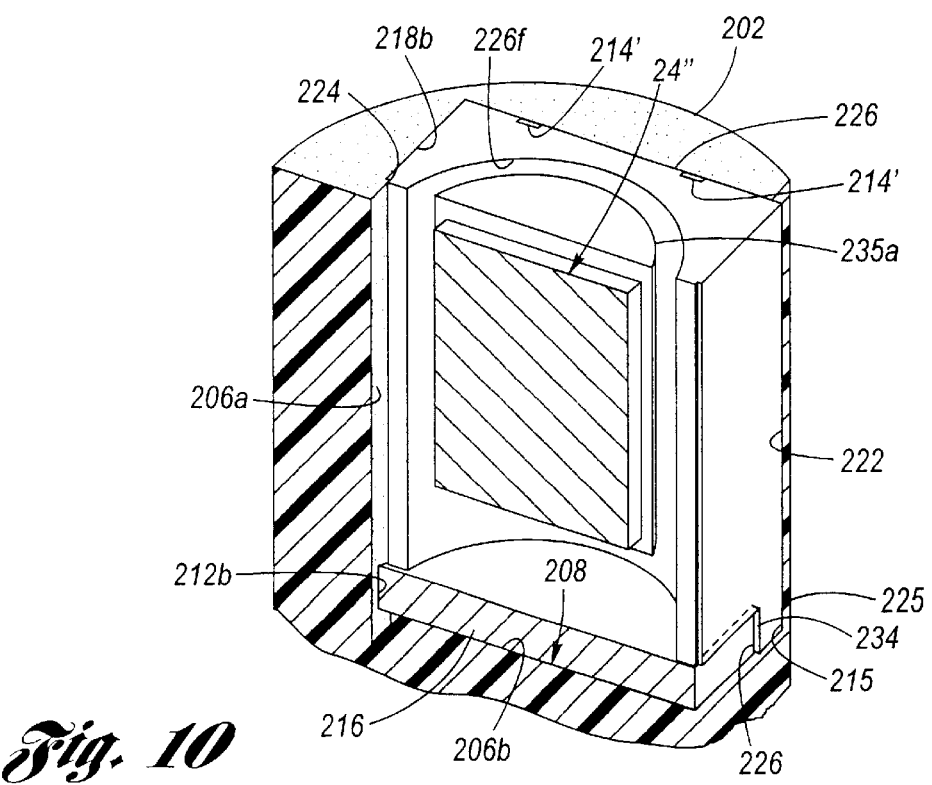
FIG. 10 is a partly sectional view seen along line 10—10 in FIG. 9.
Figure 11:
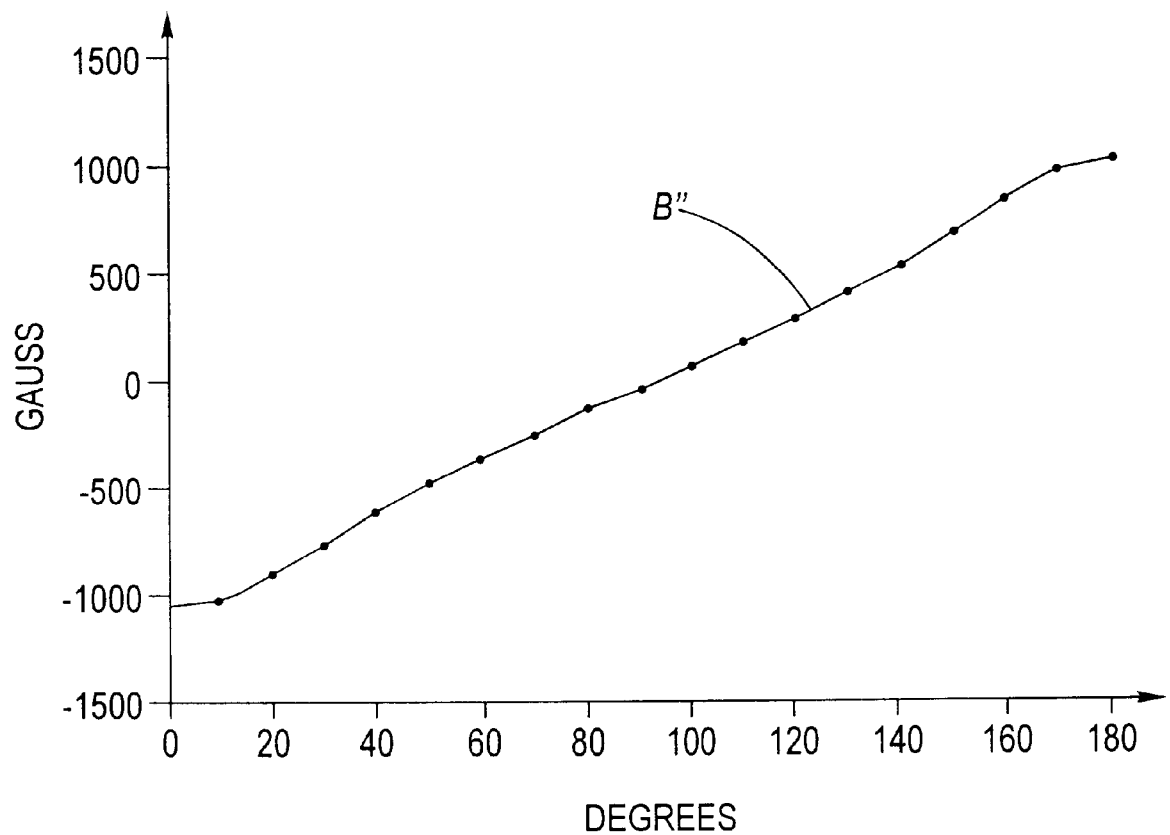
FIG. 11 is a graph of the magnetic field strength versus position for the working air gap of FIG. 9.

Turning attention next to FIGS. 9 through 11, aspects of a second rotary position sensor 200 utilizing a second magnet assembly 200' according to the present invention are shown. A plastic casing 202 has a blind hollow 204 formed therein defined by a sidewall 206a and a blind end 206b. A magnet pocket 208 and a pair of diametrically opposed pole piece pockets 210a, 210b are formed in the casing 202 at the sidewall and blind end of the blind hollow 204.

The magnet pocket 208 is formed in the blind end 206b, having a preferably rectangular recess cooperatively defined by mutually opposed magnet pocket walls 212a, 212b and the aforesaid blind end. At each of the magnet pocket walls 212a, 212b is, preferably, formed at least one nib 214 which protrusively overhangs the magnet pocket 208.

A permanent magnet 216 having a shape complementary to that of the magnet pocket 208 is snapped into the magnet pocket by being pressed past the nibs 214, which, if present, resiliently give and then overhang the permanent magnet upon its being seated at the magnet pocket.

The pole piece pockets 210a, 210b are formed in the sidewall 206a of the casing 202 in upstanding relation to the magnet pocket 208 and in perpendicular relation to the magnet pocket walls 212a, 212b. Each pole piece pocket 210a, 210b is defined by a preferably rectangular recess having a leg pocket 215 cooperatively defined by mutually opposed pole piece pocket walls 218a, 218b, a bottom wall 220 at the leg pocket 215 preferably in plane with the blind end, and a back wall 222 which is perpendicular to each of the pole piece pocket walls and the bottom wall. The pole piece pocket walls 218a, 218b are offset in relation to their respectively adjacent the magnet pocket walls 212a, 212b, thereby forming a pair of abutment shoulders 224. At each of the back walls 222 is formed at least one nib 214' which protrusively overhangs the respective pole piece pocket 210a, 210b.

A pair of pole pieces 226, 228, are provided for placement into the pole piece pockets 210a, 210b, each being composed of a ferromagnetic material, and each being complementarily shaped with respect to its pole piece pocket, including a leg 225 for placement into its respective leg pocket 215. Each pole piece 226, 228 is snapped into its respective pole piece pocket 210a, 210b by being pressed past the nibs 214', which resiliently give and then overhang the respective pole piece upon its being seated at the respective pole piece pocket. When seated, each pole piece 226, 228 has a face 230, 232 at the leg 225 which is in good contact with a respective permanent magnet pole 234, 236 thereby providing minimal reluctance to the magnetic circuit at the interface therebetween.

Each of the pole pieces 226, 228 overlies the permanent magnet 216 and has a mutually facing concave pole piece face 226f, 228f which define the working air gap 238. The permanent magnet 216 is fixed in place relative to the casing 202 by the overlying pole pieces 126, 128 and nibs 214 (if present) versus the blind end 206b, the opposed magnet pocket walls 212a, 212b and the leg 225 of the two pole pieces 226, 228. Since the pole pieces 126, 128 overlie the permanent magnet, the nibs 214 are not mandatory to hold the permanent magnet in place.

Each pole piece 226, 228 is fixed in place relative to the casing 202 by the nibs 214' versus the bottom wall 220, the opposed pole piece walls 218a, 218b, and the back wall 222 versus the permanent magnet 216 at the leg 225 and the abutment shoulders 224.

The magnetosensitive device 24" for placement in the working air gap 238 is preferably sandwiched by a pair of semi-circular ferromagnetic (steel) flux shapers 235a, 235b. The flux shapers 235a, 235b are fixed in relation to the magnetosensitive device 24" and collectively form a sensor package 245.

As shown at FIG. 9, the magnetic field B" which is provided in the working air gap 238 is substantially uniform along the axial centerline 140. Accordingly, the signal output of a magnetosensitive device 24" placed into the working air gap is accurately responsive to its orientation with respect to the direction of the magnetic field B in the working air gap.

The casing 102 is configured to be associated with an article which is rotatable with respect to the base 142 (which may, for example be a circuit board) upon which the magnetosensitive device 24' is connected. For example, the article may be a shaft 12' having an end which is press-fit into a shaft cavity 144 formed in the casing 102 opposite the bind hollow 104.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A magnet assembly for a rotary position sensor comprising:
    a casing having a blind hollow defined by a blind end and a sidewall, said casing comprising:
        a magnet pocket formed in said blind end, said magnet pocket having a first end and an opposite second end;
        a first pole piece pocket formed in said side wall at said first end; and
        a second pole piece pocket formed at said second end;
    a permanent magnet having first and second poles, said permanent magnet being seated in said magnet pocket so that said first pole is located at said first end and said second pole is located at said second end;
    a first pole piece seated in said first pole piece pocket so that a portion thereof abuts said first pole, said first pole piece having a first pole piece face; and
    a second pole piece seated in said second pole piece pocket so that a portion thereof abuts said second pole, said second pole piece having a second pole piece face;
    wherein a working air gap is provided between said first and second pole piece faces.

2. The assembly of claim 1, wherein said first and second pole piece pockets further comprise a snap fitting interface respectively in relation to said first and second pole pieces.

3. The assembly of claim 2, wherein said magnet pocket comprises a snap fitting interface in relation to said permanent magnet.

4. The assembly of claim 3, wherein said casing comprises plastic.

5. The assembly of claim 2, wherein said first and second pole piece faces are each concavely shaped.

6. The assembly of claim 5, wherein said first and second pole pieces further comprise a leg, wherein each of said first and second pole piece pockets comprise a leg pocket for receiving therein a respective first and second leg, and wherein each said leg abuts a respective pole of said first and second poles.

7. The assembly of claim 6, wherein a portion of said first and second pole pieces overlie said permanent magnet.

8. The assembly of claim 7, wherein said casing comprises plastic.

9. The assembly of claim 8, wherein said magnet pocket comprises a snap fitting interface in relation to said permanent magnet.

10. A rotary position position sensor comprising:
    a magnetosensitive sensor;
    a casing having a blind hollow defined by a blind end and a sidewall, said casing comprising:
        a magnet pocket formed in said blind end, said magnet pocket having a first end and an opposite second end;
        a first pole piece pocket formed in said side wall at said first end; and
        a second pole piece pocket formed at said second end;
    a permanent magnet having first and second poles, said permanent magnet being seated in said magnet pocket so that said first pole is located at said first end and said second pole is located at said second end;
    a first pole piece seated in said first pole piece pocket so that a portion thereof abuts said first pole, said first pole piece having a first pole piece face; and
    a second pole piece seated in said second pole piece pocket so that a portion thereof abuts said second pole, said second pole piece having a second pole piece face;
    wherein a working air gap is provided between said first and second pole piece faces, and wherein said magnetosensitive device is located within said working air gap.

11. The sensor of claim 10, wherein said first and second pole piece pockets further comprise a snap fitting interface respectively in relation to said first and second pole pieces.

12. The sensor of claim 11, wherein said magnet pocket comprises a snap fitting interface in relation to said permanent magnet.

13. The sensor of claim 12, wherein said casing comprises plastic.

14. The sensor of claim 11, wherein said first and second pole piece faces are each concavely shaped.

15. The sensor of claim 14, wherein said first and second pole pieces further comprise a leg, wherein each of said first and second pole piece pockets comprise a leg pocket for receiving therein a respective first and second leg, and wherein each said leg abuts a respective pole of said first and second poles.

16. The sensor of claim 15, wherein a portion of said first and second pole pieces overlie said permanent magnet.

17. The sensor of claim 16, further comprising a pair of semi-circular ferromagnetic flux shapers sandwiching said magnetosensitive device.

18. The sensor of claim 17, wherein said casing comprises plastic.

19. The sensor of claim 18, wherein said magnet pocket comprises a snap fitting interface in relation to said permanent magnet.

* * * * *